United States Patent [19]

Schouten

[11] Patent Number: 5,749,287
[45] Date of Patent: May 12, 1998

[54] PERFORATED DRAINAGE PIPE FOR DRAINING WHEY/CURD MASS

[75] Inventor: Frank Schouten, Donkerbroek, Netherlands

[73] Assignee: Tebel-MKT B.V., Netherlands

[21] Appl. No.: 329,597

[22] Filed: Oct. 26, 1994

[51] Int. Cl.[6] .................................................. A01J 25/00
[52] U.S. Cl. ............................................ 99/458; 99/456
[58] Field of Search .......................... 99/458, 459, 456, 99/503, 508, 513; 210/460, 461; 138/103; 209/680, 682, 683, 397; 405/43, 45; 239/542, 547

[56] References Cited

U.S. PATENT DOCUMENTS

| 3,982,480 | 9/1976 | Kamphuis . | |
|---|---|---|---|
| 4,244,286 | 1/1981 | Rust | 99/459 |
| 4,568,554 | 2/1986 | Derode | 99/459 |
| 4,811,658 | 3/1989 | Brandsema et al. | 99/458 |
| 4,960,044 | 10/1990 | Yntema | 99/458 |
| 4,976,980 | 12/1990 | Yntema . | |

FOREIGN PATENT DOCUMENTS

| 0020092 | 11/1904 | Austria | 99/458 |
|---|---|---|---|
| A-688365 | 3/1967 | Belgium . | |
| 0 252 545 | 1/1988 | European Pat. Off. . | |
| A-0533180 | 3/1993 | European Pat. Off. . | |
| A-2517512 | 6/1983 | France . | |
| A-8801381 | 12/1989 | Netherlands . | |
| 89/03274 | 4/1989 | WIPO . | |

*Primary Examiner*—Reginald L. Alexander
*Attorney, Agent, or Firm*—Pennie & Edmonds LLP

[57] ABSTRACT

The invention relates to a drainage pipe with perforations for draining whey from a whey/curd mass, in which the perforations are formed by small holes, and the hole size lies within the range 0.05–3 mm, while the hole density lies within the range 5–50,000 holes/cm$^2$. Such a pipe is used in the preparation of cheese. In a drainage pipe which is provided with a large number of small holes, a larger part of the surface can be perforated, with the result that the drainage is more efficient. A natural counterpressure can be built up by varying the hole size and the hole density over the surface of the pipe, thus making expensive facilities for regulating the counterpressure unnecessary. The hole size and/or hole density can be varied in such a way over the surface of the pipe that the open surface increases from top to bottom. Various grid patterns are described for this. If the pipe is made of plastic, the full circumference of the pipe can be provided with holes, with the result that the full surface of the pipe is available for drainage. The invention also relates to a device which is provided with at least one drainage pipe of the type according to the invention and to methods for manufacturing such a drainage pipe.

14 Claims, 2 Drawing Sheets

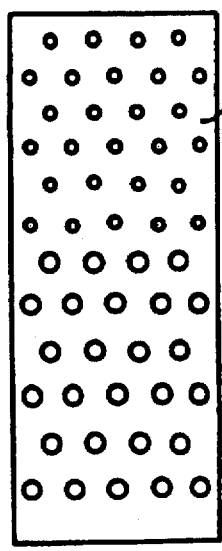
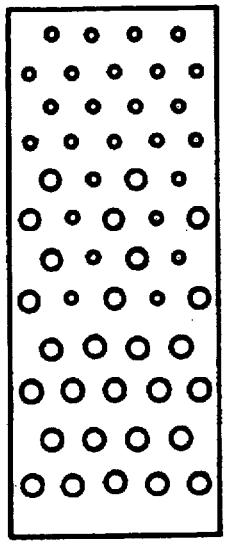
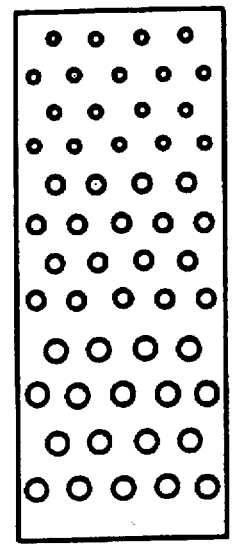
FIG. 3A     FIG. 3B     FIG. 3C
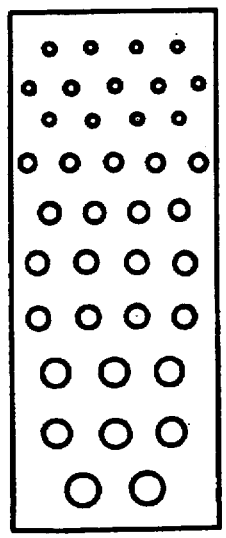
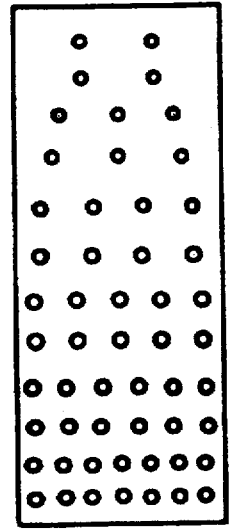
FIG. 3D     FIG. 3E

PERFORATED DRAINAGE PIPE FOR DRAINING WHEY/CURD MASS

BACKGROUND OF THE INVENTION

The invention relates to a drainage pipe with perforations for draining whey from a whey/curd mass. Such a drainage pipe is known from Dutch Patent Application 8802715.

In the preparation of cheese, milk is heated up to approximately 30° C., enzymes and a lactic acid bacterial culture are then added, following which the milk becomes unstable. Within a short time the liquid milk changes into a cuttable mass, a smooth gel which is cut into pieces. Interaction between the protein chains present causes the pieces to shrink and spontaneously expel moisture, a process known as syneresis. The moisture released—a cloudy, pale green liquid—is the whey.

Some of the whey is drained off, and the curd (i.e. the solids from which most of the whey has already been removed) is then guided through a drainage device. The curd blocks thus produced are placed some time later in a cheese vat and pressed.

The known drainage device is provided with one or more stainless steel perforated drainage pipes. It is vitally important that the whey should be drained from the whey/curd mass in a controlled manner. Poor drainage of the curd can cause quality problems. For instance, cracks in the curd block can give rise to mould. If whey flows out too quickly, curd is entrained against the perforations and thus can block or clog those perforations.

In the case of the known drainage device, the drainage is limited by a liquid pressure gradient in the discharge for the whey. The outflow of whey is regulated by placing a mechanical barrier, with the result that a liquid counterpressure is created. When the level of the liquid counter pressure is set, the outflow velocity of the whey is controlled. Counter pressure is important particularly in the case of pipes with a diameter greater than 150 mm.

However, such a system cannot be controlled accurately, because the flowability through the curd can differ from place to place by a factor of 1000. However, such accurate setting and variation of the liquid counter pressure is not possible. For that reason, caution is exercised, and very low limit values are selected, so that ultimately too much whey remains in the curd block.

Another control system is that in which the outflow of the whey is controlled by a valve. In this case the control is directed towards a quantity of whey, and not towards a predetermined liquid counter pressure. Such a solution is known, for example, from a thesis by J. C. Akkerman, entitled "Drainage of curd", L. U. Wageningen, 1992.

A disadvantage of this solution is that whey remains in the drainage pipe when the valve is shut, which is undesirable from the point of view of hygiene.

Furthermore, the disadvantage of both control systems is that expensive facilities such as pipes, valves and measuring and control equipment have to be provided.

In the case of the known stainless steel drainage pipe, about 50% of the entire pipe length is perforated. These are slit perforations with slit dimensions of, for example, 11 by 0.8 mm. The wall thickness of the pipe is 0.8 mm. Due to the relatively large slits, a large quantity of "curd dust" is entrained in the top part of the drainage pipe. The top end of the drainage pipe is therefore provided with a blind part, in order to overcome this disadvantage, i.e. too rapid outflow of whey and curd dust.

The space between at least one drainage pipe and a sleeve disposed around it in the above mentioned published Dutch Patent Application is divided by means of horizontal partitions into counter pressure chambers. The whey flowing out through the perforations is drained off through the counter pressure chambers and riser pipes. Drainage of the whey/curd column present inside the drainage pipe is regulated by means of the counter pressure chambers in conjunction with the riser pipes, so that a manageable curd block is obtained at the bottom of the drainage pipe.

At the places where the horizontal partitions are situated, the drainage pipe also has blind parts, on account of the prevailing pressure differences. Without these blind parts, the emerging whey would take the line of least resistance and flow out of the annular part around the flange or seal to the annular part lying below.

The presence of the blind parts on the drainage pipe means that not all of the surface over the length of the pipe can be used for drainage. This has the disadvantage that drainage does not take place efficiently over the entire surface of the pipe.

For production reasons, it is not possible to reduce the slit width of the perforations, since the slit width is related to the sheet thickness of the drainage pipe. Thinner sheet is almost impossible to weld. In the manufacture of a drainage pipe, a flat perforated sheet is, for example, welded to a circular shape, giving a drum shaped or right circular cylinder. No slits are present at the position of the weld, which is about 1 cm wide. There will thus be no drainage of whey at this position either.

In view of the wall thickness of the stainless steel sheet, slits over more than 50% of the surface produce a pipe which is more difficult to handle, because the mechanical strength leaves something to be desired.

Another disadvantage of stainless steel is the relatively high weight. This means that aids have to be used when the pipes are being changed.

SUMMARY OF THE INVENTION

The object of the invention is to provide a drainage pipe in which drainage occurs over the entire surface or part of the surface of the drainage pipe, with the result that a more efficient drainage of the whey/curd mass occurs in the drainage pipe.

Another object of the invention is to provide a drainage pipe in which expensive mechanical aids for setting the liquid counter pressure are not necessary.

Yet another object of the invention is to provide a drainage pipe which is easy to change.

The drainage pipe according to the invention is characterized in that the perforations are formed by small holes, and the hole size lies within the range of 0.05–3 mm, while the hole density lies within the range of 5–50,000 holes/cm$^2$.

Providing a large number of holes, each of which is small in size, in the surface of the drainage pipe means that a larger open surface, which is available for the drainage of whey, is obtained. The result is that the drainage of the whey/curd mass will be more efficient, without the mechanical strength of the drainage pipe being reduced.

Where the hole size is less than 0.05 mm, drainage cannot be efficient, while at a hole size greater than 3 mm too much whey can flow out of the whey/curd mass. In the latter case there is also a risk of curd dust and curd particles flowing with the whey out of the pipe.

The hole density is connected with the hole size. At a hole density greater than 50,000 holes/cm$^2$, too much whey may be drained off. In that case the mechanical strength of the pipe is also too low. At a hole density of less than 5 holes/cm$^2$ the open surface formed by the holes is too small to produce efficient drainage.

In an advantageous embodiment of the drainage pipe according to the invention the hole size and/or the density of the holes is varied over the surface of the pipe.

In the case of this embodiment the holes can be made in the pipe in such a way that a natural counter pressure is built up. In this way efficient drainage is obtained and, if the size of the holes is carefully selected, there can also be a great reduction in curd dust loss. Since a natural counter pressure is built up by the holes, further measures for setting a counter pressure with mechanical aids are unnecessary. The commissioning period can therefore be made shorter, and expensive facilities such as valves, pipes, control etc. are no longer necessary, with the result that a considerable cost saving is obtained.

With the drainage pipe according to the invention, the same quantity of whey can be drained from the whey/curd mass in a shorter time than in the case of the known drainage pipe, with the result that the production of curd blocks is increased per unit time.

It is also possible to set the same residence time, so that a larger quantity of whey per unit time can be drained off and the curd block obtained contains a smaller quantity of whey. The quantity of whey to be removed depends on the desired composition of the cheese type. The whey/curd mass must contain some whey, otherwise the sliding properties of the mass are lowered, and as a result the mass could stick in the drainage pipe.

The natural counter pressure is advantageously built up by increasing the open surface, formed by the holes, from one end of the pipe to the other end of the pipe. The increase in the open surface is more preferably uniform. Due to the fact that the entire surface of the pipe is available for drainage, the drainage of whey from the whey/curd mass is more efficient.

If desired, the drainage pipe can be provided over the entire surface with holes of the same size and density. The open surface is greater than the open surface of the slits of the known drainage pipe, with the result that a larger quantity of whey can be drained from the whey/curd mass. In this case additional measures for setting the counter pressure are necessary.

In a preferred embodiment, the pipe is made of plastic. The mechanical strength of such a plastic pipe (wall thickness 1–10 mm, usually about 5 mm and the small dimensions of the holes) allows a greater part (up to about 90%) of the pipe to be perforated. This produces more efficient drainage. No welded joints are present either, with the result that the holes can be provided over the entire surface, distributed over the length of the pipe.

Due to the larger perforated surface of the pipe, the duration of drainage will also be greater. Therefore, while residence time remains the same, a longer period of drainage of the whey/curd mass in the pipe is possible. Such a plastic pipe is also easier to handle, on account of its lower weight.

The pipe is preferably made of polyethylene (PE), on account of the inert nature of this plastic.

In order to produce efficient drainage over the entire surface of the pipe and to build up a natural counter pressure, the open surface in the part of the pipe which is being used as the top is preferably made smaller than the open surface in the part of the pipe which is being used as the bottom.

The open surface, formed by the holes, can be varied through variation of the hole size and/or the hole density over the surface of the pipe. The density of the holes is preferably 20 to 35/cm$^2$, and more preferably 25 to 30/cm$^2$, in particular 28/cm$^2$. The hole size is preferably 1 mm, and more preferably 0.3 to 0.5 mm.

It is clear that a larger open surface can be obtained over the length of the pipe than in the case of a stainless steel pipe.

The shape of the perforations is preferably round. However, other shapes such as square, rectangular, oval or triangular etc. are also possible.

In order to produce efficient drainage over the entire surface of the pipe, the holes are preferably disposed in the pipe in a regular grid pattern.

In another embodiment, the holes can be provided arbitrarily in the pipe.

The invention also relates to a device for the drainage of whey from a whey/curd mass, comprising at least one drainage pipe and also means for feeding in whey/curd mass and draining whey and discharging the curd block, and is characterized in that the device comprises at least one drainage pipe of the type described above according to the invention. With this device, efficient drainage over the entire surface of the pipes is possible, as already stated above. Preferably, but not necessarily the pipe is made of plastics.

In addition, the invention relates to a method for manufacturing a drainage pipe for draining whey from a whey/curd mass, in which after its formation a suitable pipe is provided with perforations for essentially selectively allowing passage of whey from a whey/curd mass situated in the pipe, and is characterized in that the perforations are holes which are made subsequently in the pipe by means of a controlled laser or electron beam, and a pipe of the type according to the invention described above is thus formed. The material to be perforated is passed through under the laser head, and the intended regular or arbitrary pattern of holes is made in the material. The hole size can be varied by a suitable choice of the lens of the laser head and the distance between the laser head and the material to be perforated.

In another embodiment of the method for manufacturing a drainage pipe according to the invention, the holes are provided during the manufacture of the pipe. This method of manufacturing a drainage pipe for draining whey from a whey/curd mass, in which a suitable pipe is provided with perforations for essentially selectively allowing passage of whey from a whey/curd mass situated in the pipe, is characterized in that the perforations are holes which are provided during the manufacture of the pipe, and a pipe according to the invention of the type described above is thus formed.

A preferred embodiment of such a method is that in which the pipe is manufactured through electrode position of a metal onto a filled electroforming mould which is provided with a grid pattern of recesses filled with electrically insulating material according to the pattern of holes to be formed in the pipe. The electroforming mould is a metal cylinder which is provided with recesses according to the grid pattern to be formed in the pipe, which recesses are filled with an insulating plastic. The metal is deposited by electrolysis on the metal surface of the cylinder, the plastic-filled recesses not being covered. In this way a pipe is made in one piece in which no seams are present, so that the entire surface of the pipe is available for drainage.

Such a pipe is preferably made of nickel or copper. From the point of view of health, it will be expedient to provide a covering layer on the pipe. The covering layer, which completely encloses the metal, is preferably made of a plastic. More particularly, such a plastic is polytetra fluoro ethylene, on account of its inert character.

BRIEF DESCRIPTION OF THE DRAWINGS

The invention will be explained in greater detail with reference to the drawings, in which:

FIGS. 3a–3e are examples of possible grid patterns of the holes in the drainage pipe according to the invention.

DETAILED DESCRIPTION OF THE INVENTION

Figure 1:
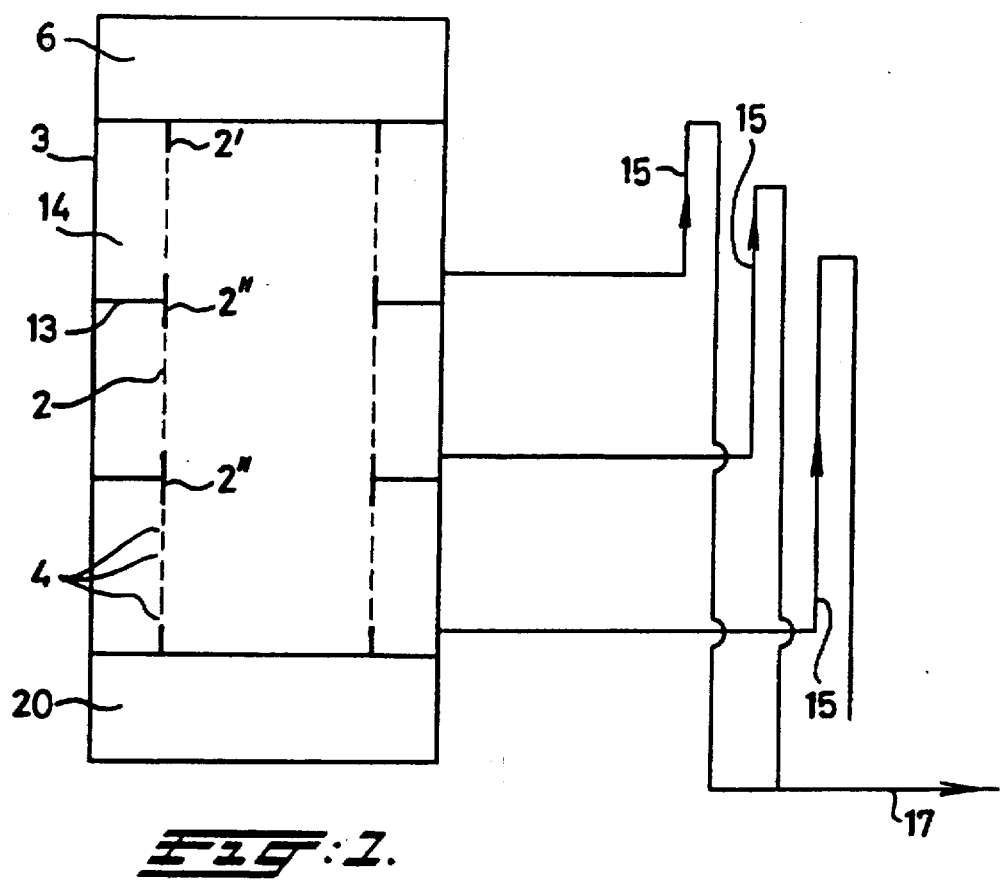
FIG. 1 is a diagrammatically shown device according to the prior art.

In the case of the known device illustrated diagrammatically in FIG. 1 the whey/curd mass is guided into a column through means 6 for feeding the whey/curd mass into a drainage pipe 2, which is provided with perforations 4. The drainage pipe 2 is surrounded by a sealed sleeve 3. The whey emerging from the mass is further discharged through riser pipes 15 and subsequently through a pipe 17. Reference number 20 indicates means for discharging the curd block.

Reference number 2' indicates a blind part of the drainage pipe 2, which has the function of preventing premature emergence of whey and of reducing curd dust loss at the top of the pipe. Partitions 13 divide the annular spaces between the pipe 2 and the sleeve 3 into counter pressure chambers 14. The blind parts 2" prevent leakage flows from one counter pressure chamber 14 to the other chamber lying there below.

Figure 2:
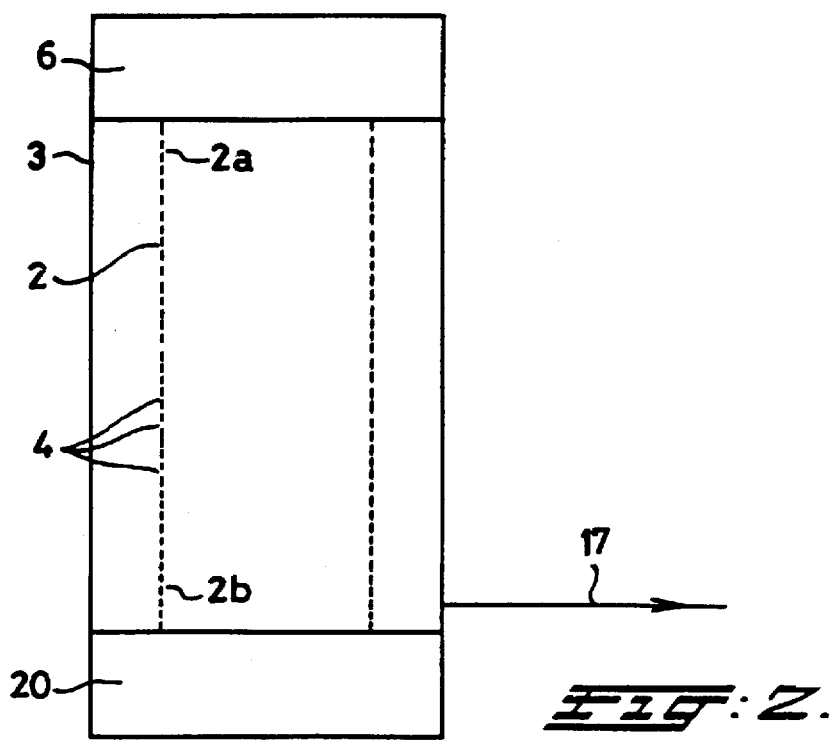
FIG. 2 shows a device according to the invention.

FIG. 2 shows diagrammatically a device according to the invention, in which the drainage pipe according to the invention is used. The parts of the device which are identical to the parts of the known device according to FIG. 1 are indicated by the same reference numbers in FIG. 2.

The device according to the invention consists of a drainage pipe 2 with holes 4, around which a concentric sleeve 3 is disposed. In this example the holes 4 are uniformly distributed over the entire surface of the length of the drainage pipe 2. Means 6 for feeding in whey/curd mass are disposed on the top side of the drainage pipe 2, while means 20 for discharging the curd block are present on the bottom side. The outflowing whey is removed by means 17 for draining thereof from the drainage pipe 2 and the sleeve 3. As can be seen clearly from FIG. 2, substantially the entire surface over the length of the drainage pipe 2 is provided with holes 4. This figure also shows the relatively simple design of the device according to the invention compared with the known device, because the device according to the invention comprises no additional facilities for setting the counter pressure.

In order to improve the drainage and sliding properties of the pipe, knife cuts 21 can be present on the inner surface of the pipe. This improves the drainage of whey from the whey/curd mass, while the knife cuts are of such small dimensions that no curd particles can remain therein and thus impede the downward slide of the whey/curd mass. These so-called knife cuts are known per se from Dutch Patent Application 8,801,381, which has been laid open for inspection. Preferably at least part of the knife cuts extend in the longitudinal direction of the pipe.

Various examples of hole patterns are given in FIG. 3.

FIG. 3a shows a hole pattern with an abrupt transition of the hole diameter, while the hole density remains the same.

In FIG. 3b three zones can be distinguished, a first zone, in this example the top zone or top end portion, with holes of small diameter, an intermediate zone or portion in which both holes of small diameter and holes of large diameter are present, and a final zone or bottom end portion only with holes of large diameter. The hole density is the same over the entire length of the pipe. However, at least one of the size and the density incrementally increases and decreases within the intermediate portion while generally increasing from the top end portion to the bottom end portion.

FIG. 3c shows two abrupt transitions of the open surface, formed by the holes, in which a first zone with holes of small diameter is present. Following which a zone with holes of medium diameter is present. At the bottom a third zone with holes of large diameter is present.

In FIGS. 3a–3c the hole density over the surface of the pipe is the same, i.e. the number of holes per unit surface is the same.

FIG. 3d shows a gradual increase of the open surface, in which the hole diameter increases continuously.

FIG. 3e shows a gradual transition from a small hole density to a large hole density, with the hole diameter remaining the same.

In the case of the stainless steel pipes currently in use, which are provided with slits over about 50% of the surface, the open surface over the entire length of the pipe is about 6.25 $mm^2/cm^2$. The open surface of a plastic pipe which is perforated over 90% of the surface depends on the number of holes/$cm^2$ and on the size of the holes. Where the holes are round and of uniform size, and where the hole density is 28/$cm^2$, an open surface of 3.17, 4.95, 7.13 and 9.70 $mm^2/cm^2$ at a respective hole diameter of 0.4, 0.5, 0.6 and 0.7 is obtained.

In an embodiment according to FIG. 3a, it is possible, for example, for 40% of the surface of the plastic pipe to be perforated with holes having a diameter of 0.5 mm, and for 60% of the surface to be perforated with holes having a diameter of 0.7 mm. The open surface of the pipe is then 7.80 $mm^2/cm^2$.

Experiments have been carried out with drainage pipes according to the invention and with a drainage pipe of stainless steel according to the prior art. The results of these experiments are given in Table 1.

TABLE 1

| Experiment | Pipe material | Hole diameter | Hole density | Open surface | Result |
|---|---|---|---|---|---|
| 1 | PE | 0.5 mm | 28/$cm^2$ | 2.75 $mm^2/cm^2$ | curd block did not stick in the drainage column |
| 2 | PE | 0.35 mm | 28/$cm^2$ | 1.35 $mm^2/cm^2$ | curd block did not stick in the drainage column |
| 3 | PE | 0.5/0.35 mm | 28/$cm^2$ | 4 $mm^2/cm^2$ | separated moisture after pressing 23.5 wt % |
| 4 | st. steel | 11 × 0.8 mm[a] | 1.5/$cm^2$ | 6.25 $mm^2/cm^2$ | separated moisture after pressing 22.0 wt. % |

[a] = slit dimensions

According to this example, with a greater open surface of the drainage pipe it should be possible to drain so much whey from the curd/whey mixture in the column that only 21 wt % of separated moisture occurs after pressing of a curd block which has been separated from the curd in the column.

I claim:

1. Drainage pipe with perforations for draining whey from a whey/curd mass, the perforations are formed by a plurality of small holes (4) defining an open surface, the hole size lies within the range of 0.05–3 mm, while the hole density lies within the range of 5–50,000 holes/cm$^2$, the hole size and/or the hole density is varied over the surface of the pipe (2), characterized in that the open surface defined by the holes (4) increases from one end of the pipe (2) to the other end of the pipe (2).

2. Drainage pipe according to claim 1, characterized in that the increase of the open surface is uniform.

3. Drainage pipe according to claim 1, characterized in that the shape of each hole is round.

4. Drainage pipe according to claim 1, characterized in that the holes (4) are disposed in a regular grid pattern (11) in the pipe (2).

5. Drainage pipe according to claim 1, characterized in that the holes (4) are disposed arbitrarily in the pipe (2).

6. A vertical drainage pipe having a top (2a) and a bottom (2b) with perforations extending through said pins for draining whey from a whey/curd mass, the perforations formed by a plurality of small holes (4) defining an open surface, the hole size lies within the range of 0.05–3 mm, while the hole density lies within the range of 5–50,000 holes/cm$^2$, characterized in that the open surface in the part of the pipe (2) which is adjacent the top 2(a) is made smaller than the open surface in the part of the pipe (2) which is adjacent the bottom 2(b).

7. Drainage pipe according to claim 6, characterized in that the hole density is 20–35/cm$^2$.

8. Drainage pipe according to claim 7, characterized in that the hole density is 25–30/cm$^2$.

9. Drainage pipe according to claim 8, characterized in that the hole density if 28/cm$^2$.

10. A whey drainage pipe adapted for draining whey from a whey/curd mass, comprising:

a top end portion;

a bottom end portion; and a surface extending between said top and bottom end portions, said surface defining a plurality of whey drain holes distributed over the surface between said top and bottom end portions, said holes having a size and density wherein at least one of said size and said density increases from the top end portion to the bottom end portion without the other of said size and density decreasing.

11. The whey drainage pipe of claim 10, wherein at least one of said size and said density incrementally increases a first predetermined amount and then decreases a second predetermined amount less than said first predetermined amount and then increases a third predetermined amount greater than said second predetermined amount, as measured from the top end portion to the bottom end portion.

12. The whey drainage pipe of claim 10, wherein said whey drain holes are distributed over substantially the entire surface between the top end portion and bottom end portion.

13. A device adapted for preparing a curd mass by draining whey from a mixture of whey and curds, comprising:

a substantially upright whey drainage pipe including a top end portion, a bottom end portion, and a surface extending between the top and bottom end portions, said surface defining a plurality of whey drain holes distributed over the surface between the top and bottom end portions, said holes having a size and density wherein at least one of said size and density increases from the top end portion to the bottom end portion.

14. A device adapted for preparing a curd mass by draining whey from a mixture of whey and curds, comprising:

a substantially upright whey drainage pipe including a top end portion, a bottom end portion, and a surface extending between the top and bottom end portions, said surface defining a plurality of whey drain holes distributed over the surface between the top and bottom end portions, said pipe being made of plastic;

means for feeding the mixture of whey and curds into the top end portion of the whey drainage pipe; and means for discharging the curd mass from the bottom end portion of the whey drainage after whey has been drained from the whey drainage pipe via said whey drain holes.

* * * * *